United States Patent
Xiao et al.

(10) Patent No.: US 10,028,334 B2
(45) Date of Patent: Jul. 17, 2018

(54) ANTENNA FUNCTION EXTENSION APPARATUS, DEVICE, AND METHOD

(71) Applicant: Huawei Technologies Co., Ltd., Shenzhen, Guangdong (CN)

(72) Inventors: Weihong Xiao, Shenzhen (CN); Jian Shen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/448,052

(22) Filed: Mar. 2, 2017

(65) Prior Publication Data

US 2017/0181222 A1 Jun. 22, 2017

Related U.S. Application Data

(63) Continuation of application No. PCT/CN2015/088048, filed on Aug. 25, 2015.

(30) Foreign Application Priority Data

Sep. 3, 2014 (CN) .......................... 2014 1 0446084

(51) Int. Cl.
*H04W 88/08* (2009.01)
*G06K 19/14* (2006.01)
(Continued)

(52) U.S. Cl.
CPC ...... *H04W 88/085* (2013.01); *G06K 7/10366* (2013.01); *G06K 19/145* (2013.01); *H04B 1/40* (2013.01)

(58) Field of Classification Search
CPC ........................... H04W 88/085; H04W 88/02
See application file for complete search history.

(56) References Cited

U.S. PATENT DOCUMENTS 8,306,473 B2　11/2012　Anreddy et al.
8,744,502 B2 *　6/2014　Zawaideh ............ H04W 88/06
　　　　　　　　　　　　　　　　　　455/101
(Continued)

FOREIGN PATENT DOCUMENTS

CN　　　　1969464 A　　5/2007
CN　　101408947 A　　4/2009
(Continued)

*Primary Examiner* — Tuan H Nguyen

(57) ABSTRACT

The present application discloses an antenna function extension apparatus, device, and method. The apparatus includes a control unit, a storage unit, an antenna identification unit, a modulation and demodulation unit, a power supply unit, a peripheral connection unit, a radio frequency (RF) channel, a first transceiver unit, and a second transceiver unit. The control unit is separately connected to the storage unit, the antenna identification unit, the peripheral connection unit, and the modulation and demodulation unit. The first transceiver unit is connected to the antenna identification unit. The second transceiver unit is separately connected to the modulation and demodulation unit, the power supply unit, and the peripheral connection unit. After the antenna identification unit, the peripheral connection unit, and the like are introduced in the present application, antenna feature identification information may be obtained, and antenna weight data is further obtained according to the feature identification information.

14 Claims, 8 Drawing Sheets

(51) Int. Cl.
*G06K 7/10* (2006.01)
*H04B 1/40* (2015.01)

(56) References Cited

U.S. PATENT DOCUMENTS

| | | |
|---|---|---|
| 8,831,593 B2 | 9/2014 | Melester et al. |
| 2007/0080787 A1* | 4/2007 | Taki .................... G06K 7/0008 340/10.1 |
| 2010/0157909 A1 | 6/2010 | Miura et al. |
| 2010/0290553 A1 | 11/2010 | Li et al. |
| 2010/0321166 A1 | 12/2010 | Horst et al. |
| 2012/0248186 A1 | 10/2012 | Chauvet |
| 2014/0011504 A1 | 1/2014 | Gale et al. |

FOREIGN PATENT DOCUMENTS

| | | |
|---|---|---|
| CN | 201549582 U | 8/2010 |
| CN | 101946420 A | 1/2011 |
| CN | 103891179 A | 6/2014 |
| CN | 104243005 A | 12/2014 |

* cited by examiner

ANTENNA FUNCTION EXTENSION APPARATUS, DEVICE, AND METHOD

CROSS-REFERENCE TO RELATED APPLICATIONS

This application is a continuation of International Application No. PCT/CN2015/088048, filed on Aug. 25, 2015, which claims priority to Chinese Patent Application No. 201410446084.1, filed on Sep. 3, 2014. The disclosures of the aforementioned applications are hereby incorporated by reference in their entireties.

TECHNICAL FIELD

The present application relates to the field of communications technologies, and in particular, to an antenna function extension apparatus, device, and method.

BACKGROUND

As a new function based on an AISG (Antenna Interface Standards Group) standard, an RAE (remote antenna extension) function is used for performing information-based management on a smart antenna. The information-based management includes weight management and survey parameter management. When performing information-based management on the smart antenna, a base station may request a device with an RAE function for specific weight data and a survey parameter of the smart antenna by using a standard AISG interface. Then, the base station may form a beam of the smart antenna according to the weight data, so as to implement multi-dimensional adjustment on a vertical width, a horizontal width, a vertical direction, and a horizontal direction that are of the beam of the antenna. In addition, the base station may also present, to a user, survey parameters that include a geographic location, a height, a mechanical tilt, a mechanical azimuth, and the like that are of the smart antenna. Before the RAE function is introduced, a live-network smart antenna does not have the RAE function. Therefore, a method for extending a function of a smart antenna is in urgent need.

In the prior art, two manners are usually used when a function of a smart antenna is extended. A first manner is replacing or modifying a live-network smart antenna that does not have an RAE function. A second manner is adding an external RAE module that is based on an AISG standard, and extending, by using the external RAE module, a function of a live-network smart antenna that does not have an RAE function. When the external RAE module obtains weight data of the smart antenna, related information of the smart antenna, such as antenna model information, needs to be manually configured. Further, the external RAE module obtains the weight data of the smart antenna according to the manual-configured related information.

In a process of implementing the present application, the inventor finds that the prior art has at least the following problems:

For the first manner, when a live-network smart antenna that does not have an RAE function is replaced or modified, costs are high, an engineering difficulty is relatively large, and function extension efficiency is extremely low. For the second manner, because related information of a smart antenna needs to be manually configured, function extension efficiency is also relatively low.

SUMMARY

To resolve problems in the prior art, embodiments of the present application provide an antenna function extension device and an antenna function extension method. Technical solutions are as follows:

According to a first aspect, an antenna function extension apparatus is provided, where the apparatus includes a control unit, a storage unit, an antenna identification unit, a modulation and demodulation unit, a power supply unit, a peripheral connection unit, an RF (radio frequency) channel, a first transceiver unit, and a second transceiver unit;

the control unit is separately connected to the storage unit, the antenna identification unit, the peripheral connection unit, and the modulation and demodulation unit;

the first transceiver unit is connected to the antenna identification unit;

the second transceiver unit is separately connected to the modulation and demodulation unit, the power supply unit, and the peripheral connection unit; and the first transceiver unit and the second transceiver unit are separately located at two ends of the RF channel.

In a first possible implementation manner of the first aspect, the first transceiver unit is connected to a calibration port of an antenna; the second transceiver unit is connected to an RRU (remote radio unit) of a base station by using an RF cable;

the antenna identification unit is configured to obtain antenna feature identification information from an RFID (radio frequency identification) label of the antenna by using the first transceiver unit; and the power supply unit is configured to receive, by using the second transceiver unit, a direct-current power supply signal provided by the RRU.

With reference to the first aspect, in a second possible implementation manner of the first aspect, the peripheral connection unit is connected to a barcode scanner;

the peripheral connection unit is configured to transmit a scanning result of the barcode scanner to the control unit after receiving the scanning result, where the scanning result includes antenna feature identification information; and the control unit is configured to select weight data that matches the scanning result from a weight database stored in the storage unit.

With reference to the first aspect, in a third possible implementation manner of the first aspect, the peripheral connection unit is connected to a PCU (portable control unit);

the peripheral connection unit is configured to transmit an input result of the PCU to the control unit after receiving the input result, where the input result includes antenna feature identification information; and the control unit is configured to select weight data that matches the scanning result from a weight database stored in the storage unit.

With reference to the first aspect, in a fourth possible implementation manner of the first aspect, the peripheral connection unit is connected to an ASD (alignment sensor device); and the peripheral connection unit is configured to: receive an antenna survey parameter sent by the ASD, and transmit the survey parameter to the control unit.

With reference to the first aspect, in a fifth possible implementation manner of the first aspect, the peripheral connection unit is connected to another ALD (antenna line device) than an alignment sensor device; and the peripheral connection unit is configured to forward an Antenna Interface Standards Group AISG message that is between a base station and the ALD.

With reference to the first aspect, in a sixth possible implementation manner of the first aspect, the first transceiver unit includes a first BT (Bluetooth) unit, and the second transceiver unit includes a second BT unit;

the first BT unit is connected to the antenna identification unit; and the second BT unit is separately connected to the modulation and demodulation unit, the power supply unit, and the peripheral connection unit.

According to a second aspect, an antenna function extension method is provided, where the method is applied to an antenna function extension device, the antenna function extension device includes a control unit, a storage unit, an antenna identification unit, a modulation and demodulation unit, a power supply unit, a peripheral connection unit, an RF channel, a first transceiver unit, and a second transceiver unit, and the method includes:

when it is detected that the power supply unit is in a power-on state, triggering the antenna identification unit to read an RFID label of an antenna by using the first transceiver unit, to obtain antenna feature identification information;

saving the feature identification information, and selecting weight data that matches the feature identification information from a weight database stored in the storage unit; and after a modulated and converted AISG signal that is sent by the modulation and demodulation unit is received, sending the weight data to the base station by using the peripheral connection unit and the second transceiver unit.

With reference to the second aspect, in a first possible implementation manner of the second aspect, the method further includes:

when the antenna identification unit fails to read the RFID label of the antenna, receiving, by using the peripheral connection unit, a scanning result sent by a barcode scanner; and extracting the antenna feature identification information from the scanning result; where the barcode scanner is connected to the peripheral connection unit, and the barcode scanner is configured to scan a barcode of the antenna.

With reference to the second aspect, in a second possible implementation manner of the second aspect, the method further includes:

when the antenna identification unit fails to read the RFID label of the antenna, receiving an input result of a portable control unit PCU by using the peripheral connection unit; and extracting the antenna feature identification information from the input result; where the PCU is connected to the peripheral connection unit, and is configured to receive input antenna information.

With reference to the second aspect, in a third possible implementation manner of the second aspect, after it is detected that the power supply unit is in a power-on state, the method further includes:

obtaining, by using the peripheral connection unit, an antenna survey parameter in an ASD; and after a modulated and converted AISG signal that is sent by the modulation and demodulation unit is received, sending the survey parameter to the base station by using the peripheral connection unit and the second transceiver unit.

According to a third aspect, an antenna function extension device is provided, where the apparatus includes:

the device includes a controller, a memory, an antenna identification component, a modem, a power supply, an Antenna Interface Standards Group AISG interface, an RF channel, a first transceiver, and a second transceiver;

the controller is separately connected to the memory, the antenna identification component, the AISG interface, and the modem;

the first transceiver is connected to the antenna identification component;

the second transceiver is separately connected to the modem, the power supply, and the AISG interface; and the first transceiver and the second transceiver are separately located at two ends of the RF channel.

The technical solutions provided in the embodiments of the present application bring the following beneficial effects:

After an antenna identification unit, a peripheral connection unit, and the like are introduced, antenna feature identification information may be obtained, and antenna weight data is further obtained according to the feature identification information, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may still derive other drawings from these accompanying drawings without creative efforts.

DETAILED DESCRIPTION

To make the objectives, technical solutions, and advantages of the present application clearer, the following further describes the embodiments of the present application in detail with reference to the accompanying drawings.

Figure 1:
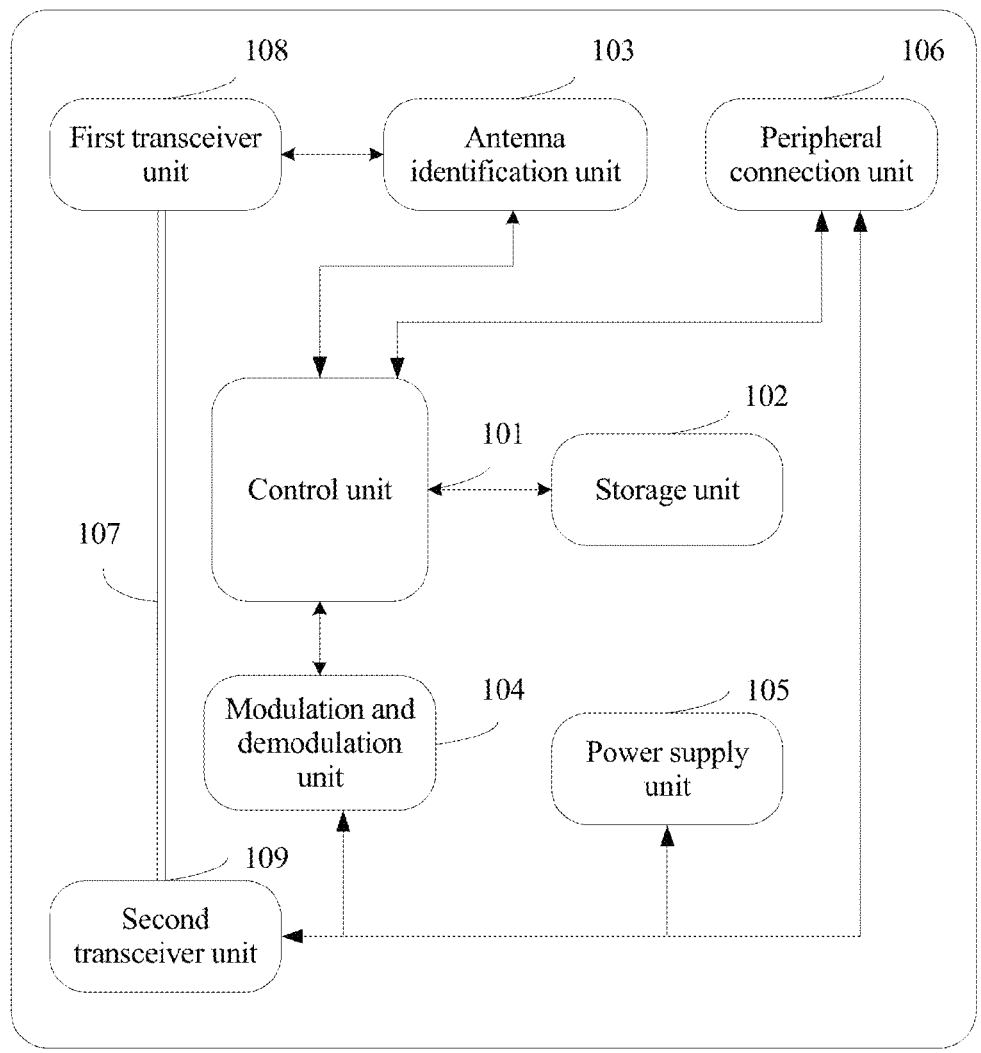
FIG. 1 is a schematic structural diagram of an antenna function extension apparatus according to an embodiment of the present application.

FIG. 1 shows an antenna function extension apparatus provided in an embodiment of the present application. An RFID unit is used as an example of an antenna identification unit. Referring to FIG. 1, the apparatus includes:

a control unit 101, a storage unit 102, an antenna identification unit 103, a modulation and demodulation unit 104, a power supply unit 105, a peripheral connection unit 106, an RF channel 107, a first transceiver unit 108, and a second transceiver unit 109.

The control unit 101 is separately connected to the storage unit 102, the antenna identification unit 103, the peripheral connection unit 106, and the modulation and demodulation unit 104. The first transceiver unit 108 is connected to the antenna identification unit 103. The second transceiver unit 109 is separately connected to the modulation and demodulation unit 104, the power supply unit 105, and the peripheral connection unit 106. The first transceiver unit 108 and the second transceiver unit 109 are separately located at two ends of the RF channel 107.

In this embodiment of the present application, the control unit 101 is a control core of the antenna function extension apparatus, is generally an MCU (micro control unit), and is configured to select weight data that matches antenna feature identification information from a weight database stored in the storage unit 102. The storage unit 102 has a relatively large storage capacity, and is configured to store the weight database of an antenna and other antenna information. The storage capacity of the storage unit 102 may be 8 G, 16 G, or the like, which is not specifically limited in this embodiment of the present application. The weight database of the antenna includes a correspondence between antenna feature identification information and an antenna weight. The antenna weight refers to a quantization representation of a specific excitation signal exerted by each port of the antenna. A purpose of exerting the specific excitation signal by the port of the antenna is to obtain a directivity pattern with a specific coverage effect. The antenna weight may be expressed in an amplitude/phase manner. An amplitude is generally expressed as a normalized voltage value |Ui| or current value |Ii| (which may also be expressed as normalized power), and a phase is expressed as an angle. The antenna feature identification information may refer to antenna model information, and a type of the feature identification information is not specifically limited in this embodiment of the present application. The other antenna information includes antenna directivity pattern information and the like, and a type of the other antenna information is not specifically limited in this embodiment of the present application either.

The antenna identification unit 103 is configured to read an RFID label of a smart antenna, so as to obtain antenna feature identification information such as antenna model information. The modulation and demodulation unit 104 is configured to convert an AISG signal between two forms: OOK and RS485, and the AISG signal is sent by a base station. The power supply unit 105 is configured to receive a direct-current power supply signal provided by the base station, so as to supply power to the antenna function extension apparatus.

The peripheral connection unit 106 is based on an AISG standard and is configured to connect to a peripheral device such as an ASD, another ALD different from an ASD, a barcode scanner, or a PCU. The ASD may obtain a survey parameter of the smart antenna. The survey parameter includes but is not limited to a geographic location parameter (including a longitude parameter and a latitude parameter), a height parameter, a mechanical tilt, a mechanical azimuth, and the like that are of the antenna. The barcode scanner may scan a barcode of the smart antenna, so as to learn model information of the smart antenna. The PCU is a near-end configuration tool, and may receive and store related information of the antenna, such as the antenna model information. The RF channel 107 connects the first transceiver unit 108 and the second transceiver unit 109. The first transceiver unit 108 is connected to the antenna, and the antenna identification unit 103 obtains the antenna feature identification information by using the first transceiver unit 108. The second transceiver unit 109 is connected to an RRU of the base station by using an RF cable. A first BT unit is disposed inside the first transceiver unit 108, and is configured to separate RFID signals. A second BT unit is disposed inside the second transceiver unit 109, and is configured to separate the direct-current power supply signal and the AISG signal from the RF cable.

After an RFID unit, a peripheral connection unit, and the like are introduced, the apparatus provided in this embodiment of the present application may obtain antenna feature identification information, and further obtain antenna weight data according to the feature identification information, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

Figure 2:
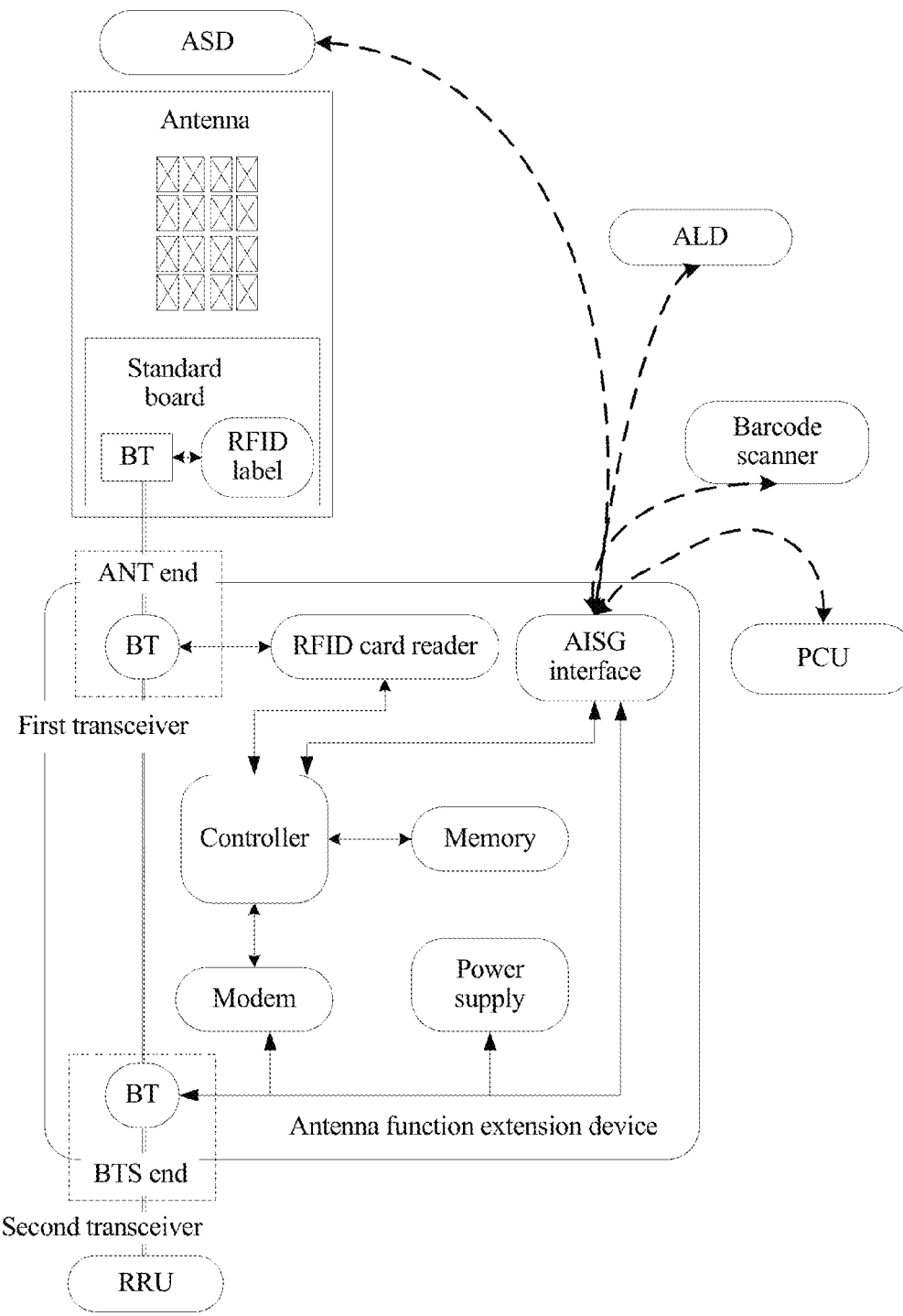
FIG. 2 is a schematic structural diagram of an antenna function extension device according to an embodiment of the present application.

Referring to FIG. 2, an antenna function extension device is corresponding to the antenna function extension apparatus in FIG. 1. An RFID card reader is used as an example of an antenna identification component. The device includes a controller, a memory, an RFID card reader, a modem, a power supply, an Antenna Interface Standards Group AISG interface, an RF channel, a first transceiver, and a second transceiver.

The first transceiver includes a BT module and an ANT (antenna) port that is connected to a calibration port of an antenna. The second transceiver includes a BT module and a BTS (base transceiver station) port that is connected to an RF cable of an RRU. The controller is a micro-computer of a chip level, and includes a memory with a relatively small capacity. After the RRU of a base station provides a direct-current power supply signal for the power supply of the antenna function extension device by using the RF cable, the antenna function extension device is started and performs software and hardware initialization. The RF channel connects the two BT modules, so that communications transmission may be performed between the two BT modules.

After the initialization is complete, the controller triggers the RFID card reader to read a card, obtains antenna feature identification information such as antenna model information from an RFID label on the antenna by using the ANT port, and stores the antenna feature identification information in a storage medium of the controller. If the RFID card reader fails to read the antenna feature identification information, the antenna feature identification information may be obtained by using a peripheral device such as a barcode scanner or a PCU, where the peripheral device is connected to an AISG interface, and the antenna feature identification information is stored in the storage medium of the controller. Then, the controller searches, in a traversing manner according to the antenna feature identification information stored in the internal storage medium, a weight database stored in the memory, to obtain weight data corresponding to the antenna feature identification information. Then, the weight data is sent to the base station by using the AISG interface and the BTS port, so that the base station forms an antenna beam according to the weight data.

After an RFID card reader, an AISG interface, and the like are introduced, the device provided in this embodiment of the present application may obtain antenna feature identification information, and further obtain antenna weight data according to the feature identification information, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

Figure 3:
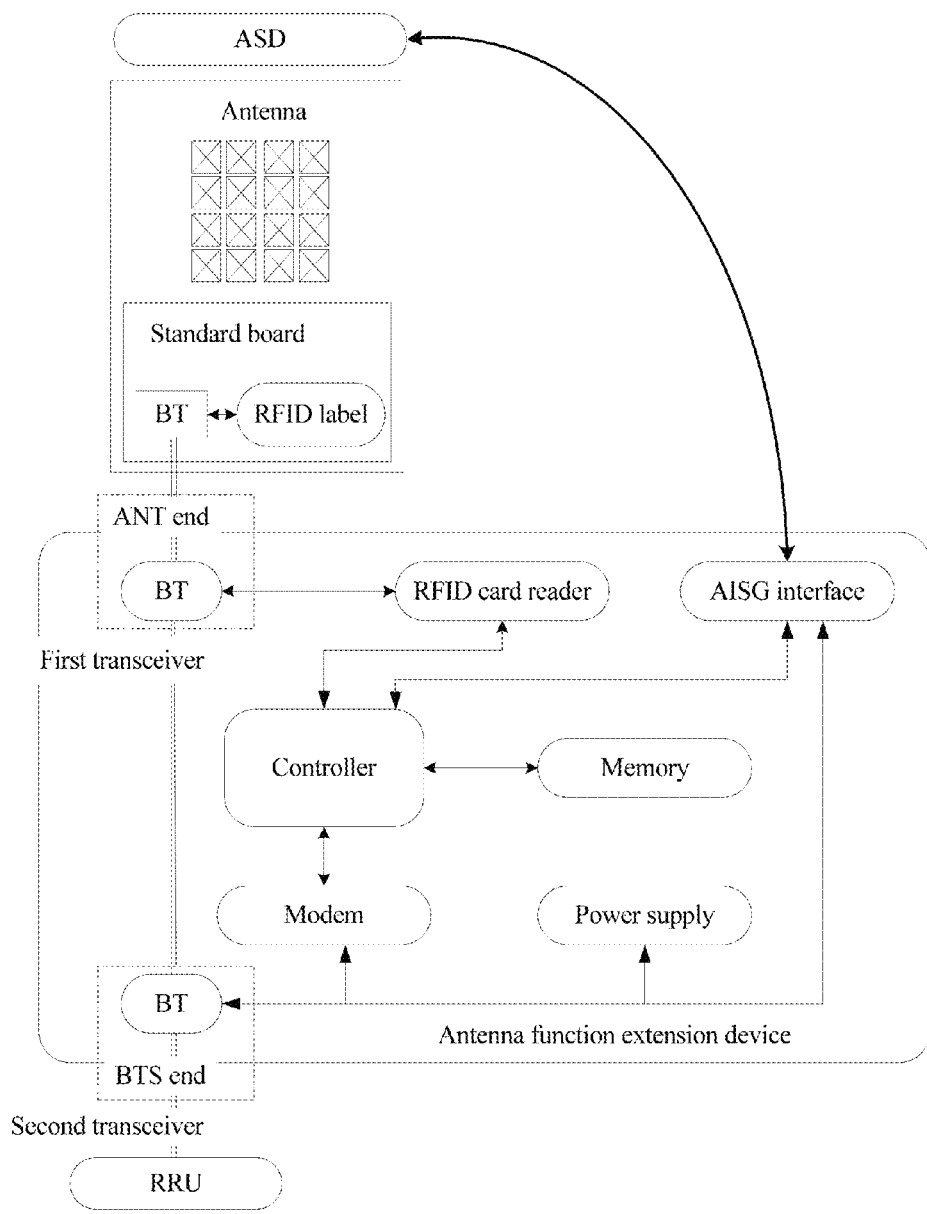
FIG. 3 is a schematic structural diagram of an antenna function extension system according to an embodiment of the present application.

Referring to FIG. 3, an RFID card reader is used as an example of an antenna identification component. An ANT port of an antenna function extension device is connected to a calibration port of an antenna, that is, the antenna function extension device is installed on the calibration port of the antenna. A BTS port of the antenna function extension device is connected to an RRU of a base station by using an RF cable. Because a smart antenna includes a standard board, that is, an RFID label is arranged on the antenna, antenna feature identification information may be directly obtained by using the RFID card reader.

After the RRU of the base station provides a direct-current power supply signal for a power supply of the antenna function extension device by using the RF cable, the antenna function extension device is started and performs software and hardware initialization. After the initialization is complete, the controller triggers the RFID card reader to read a card, obtains the antenna feature identification information such as antenna model information from the RFID label on the antenna by using the ANT port, and stores the antenna feature identification information in a storage medium of the controller. Then, the controller searches, in a traversing manner according to the antenna feature identification information stored in the internal storage medium, a weight database stored in the memory, to obtain weight data corresponding to the antenna feature identification information. Then, the weight data is sent to the base station by using an AISG interface and the BTS port, so that the base station forms an antenna beam according to the weight data.

In addition, the antenna function extension device may be connected to an ASD by using the AISG interface, and is configured to obtain a survey parameter of the smart antenna. In this embodiment of the present application, the ASD may be used as a subordinate device of the antenna function extension device. The antenna function extension device directly manages the ASD, and obtains an antenna survey parameter from the ASD, and does not present the antenna survey parameter to the base station. Alternatively, the antenna survey parameter and the antenna weight data may be presented together to the base station, which is not specifically limited in this embodiment of the present application. In addition, the ASD may be used as an independent ALD, and AISG communications transparent transmission may be performed on the ASD in a cascading manner, that is, an AISG message is forwarded between the ASD and the base station, and the base station manages the ASD.

After an RFID card reader, an AISG interface, and the like are introduced, the device provided in this embodiment of the present application may obtain antenna feature identification information, and further obtain the antenna weight data according to the feature identification information, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

Figure 4:
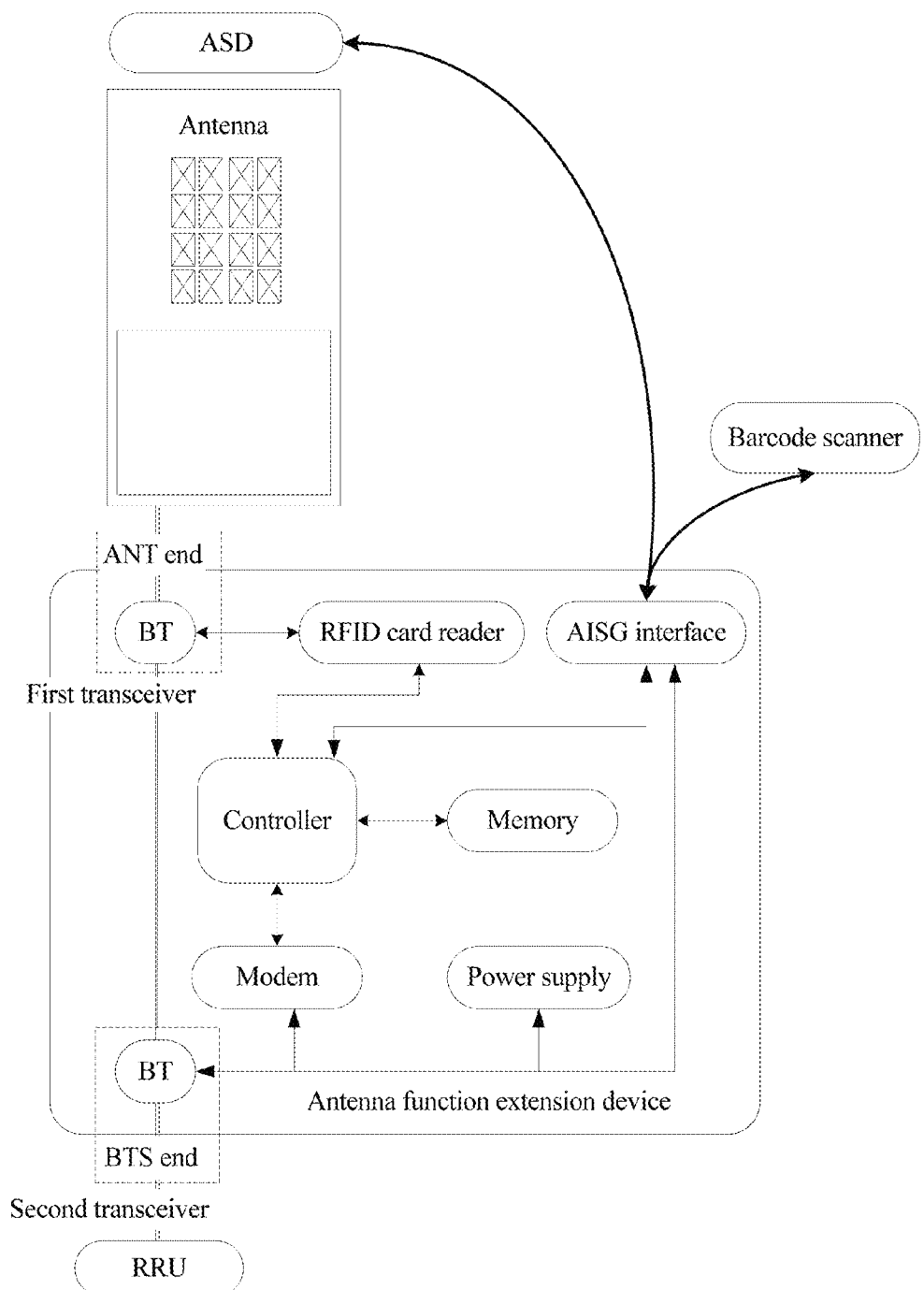
FIG. 4 is a schematic structural diagram of an antenna function extension system according to an embodiment of the present application.

Referring to FIG. 4, an RFID card reader is used as an example of an antenna identification component. An ANT port of an antenna function extension device is connected to a calibration port of an antenna, that is, the antenna function extension device is installed on the calibration port of the antenna. A BTS port of the antenna function extension device is connected to an RRU of a base station by using an RF cable. Because a smart antenna includes no standard board, that is, no RFID label is arranged on the antenna, antenna feature identification information cannot be directly obtained by using the RFID card reader. Therefore, a barcode scanner is connected by using an AISG interface.

The barcode scanner may scan a barcode of the smart antenna. A manufacturer sets a barcode for each smart antenna before the smart antenna is delivered from a factory, and basic antenna information such as antenna model information may be obtained by using the barcode.

In this embodiment of the present application, after the RRU of the base station provides a direct-current power supply signal for a power supply of the antenna function extension device by using the RF cable, the antenna function extension device is started and performs software and hardware initialization. After the initialization is complete, a controller triggers the RFID card reader to read a card. Because the antenna includes no RFID label, the RFID card reader cannot read any information. Therefore, the barcode of the antenna is scanned by using the barcode scanner, to obtain a scanning result, and the scanning result includes at least the antenna model information. After receiving the scanning result by using the AISG interface, the controller extracts the antenna model information from the scanning result, and stores the antenna model information in a storage medium of the controller. Then, the controller searches, in a traversing manner according to the antenna model information stored in the internal storage medium, a weight database stored in a memory, to obtain weight data corresponding to the antenna model information. Then, the weight data is sent to the base station by using the AISG interface and the BTS port, so that the base station forms an antenna beam according to the weight data.

In addition, the antenna function extension device may be connected to an ASD by using the AISG interface, and is configured to obtain a survey parameter of the smart antenna. In this embodiment of the present application, the ASD may be used as a subordinate device of the antenna function extension device. The antenna function extension device directly manages the ASD, and obtains an antenna survey parameter from the ASD, and does not present the antenna survey parameter to the base station. Alternatively, the antenna survey parameter and the antenna weight data may be presented together to the base station, which is not specifically limited in this embodiment of the present application. In addition, the ASD may be used as an independent ALD, and AISG communications transparent transmission may be performed on the ASD in a cascading manner, that is, an AISG message is forwarded between the ASD and the base station, and the base station manages the ASD.

After an RFID card reader, an AISG interface, and the like are introduced, the device provided in this embodiment of the present application may obtain antenna feature identification information, and further obtain antenna weight data according to the feature identification information, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

Figure 5:
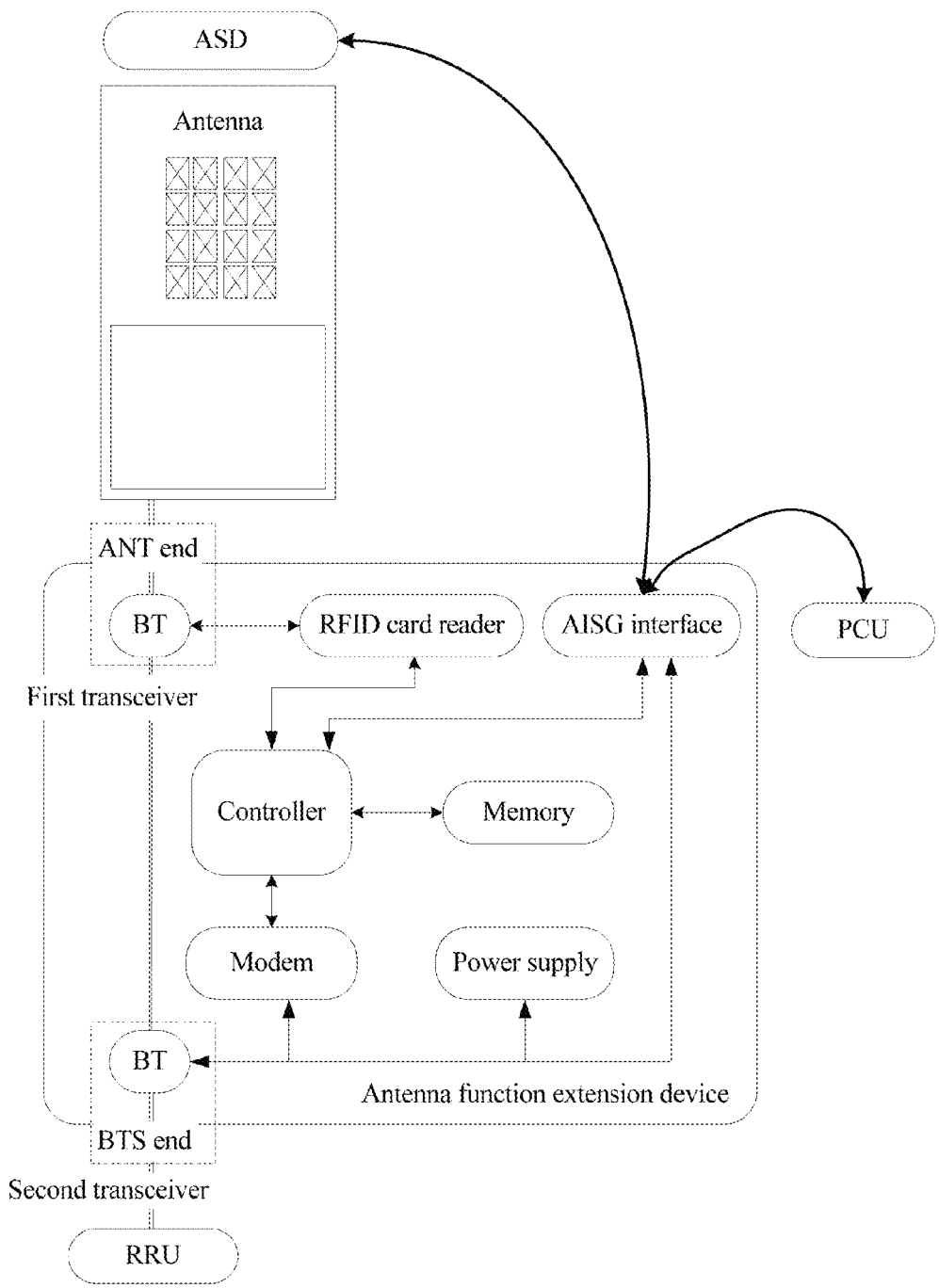
FIG. 5 is a schematic structural diagram of an antenna function extension system according to an embodiment of the present application.

Referring to FIG. 5, an RFID card reader is used as an example of an antenna identification component. An ANT port of an antenna function extension device is connected to a calibration port of an antenna, that is, the antenna function extension device is installed on the calibration port of the antenna. A BTS port of the antenna function extension device is connected to an RRU of a base station by using an RF cable. Because a smart antenna includes no standard board, that is, no RFID label is arranged on the antenna, antenna feature identification information cannot be directly obtained by using the RFID card reader. Therefore, a PCU is connected by using an AISG interface.

The PCU is a near-end configuration tool. The PCU supports a user indirect entering of related information of the smart antenna. The related information includes but is not limited to antenna model information, an antenna directivity pattern file, and the like.

In this embodiment of the present application, after the RRU of the base station provides a direct-current power supply signal for a power supply of the antenna function extension device by using the RF cable, the antenna function extension device is started and performs software and hardware initialization. After the initialization is complete, a controller triggers the RFID card reader to read a card. Because the antenna includes no RFID label, the RFID card reader cannot read any information. Therefore, the antenna model information is obtained by using the PCU. After receiving the antenna model information by using the AISG interface, the controller stores the antenna model information in a storage medium of the controller. Then, the controller searches, in a traversing manner according to the antenna model information stored in the internal storage medium, a weight database stored in a memory, to obtain weight data corresponding to the antenna model information. Then, the weight data is sent to the base station by using the AISG interface and the BTS port, so that the base station forms an antenna beam according to the weight data.

In addition, the antenna function extension device may be connected to an ASD by using the AISG interface, and is configured to obtain a survey parameter of the smart antenna. In this embodiment of the present application, the ASD may be used as a subordinate device of the antenna function extension device. The antenna function extension device directly manages the ASD, and obtains an antenna survey parameter from the ASD, and does not present the antenna survey parameter to the base station. Alternatively, the antenna survey parameter and the antenna weight data may be presented together to the base station, which is not specifically limited in this embodiment of the present application. In addition, the ASD may be used as an independent ALD, and AISG communications transparent transmission may be performed on the ASD in a cascading manner, that is, an AISG message is forwarded between the ASD and the base station, and the base station manages the ASD.

After an RFID card reader, an AISG interface, and the like are introduced, the device provided in this embodiment of the present application may obtain antenna feature identification information, and further obtain antenna weight data according to the feature identification information, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

Figure 6:
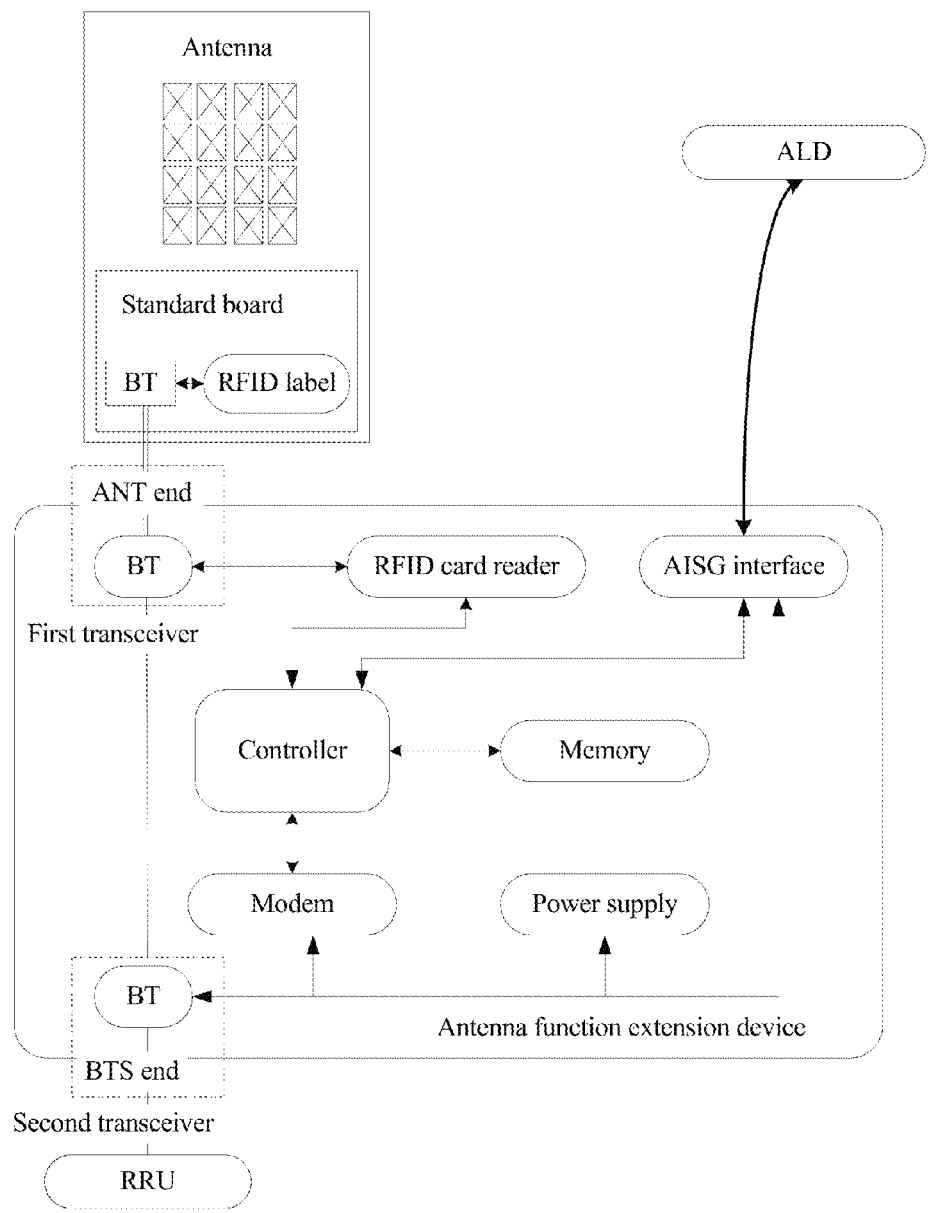
FIG. 6 is a schematic structural diagram of an antenna function extension system according to an embodiment of the present application.

Referring to FIG. 6, an RFID card reader is used as an example of an antenna identification component. An ANT port of an antenna function extension device is connected to a calibration port of an antenna, that is, the antenna function extension device is installed on the calibration port of the antenna. A BTS port of the antenna function extension device is connected to an RRU of a base station by using an RF cable. Because a smart antenna includes a standard board, that is, an RFID label is arranged on the antenna, antenna feature identification information may be directly obtained by using the RFID card reader.

After the RRU of the base station provides a direct-current power supply signal for a power supply of the antenna function extension device by using the RF cable, the antenna function extension device is started and performs software and hardware initialization. After the initialization is complete, the controller triggers the RFID card reader to read a card, obtains the antenna feature identification information such as antenna model information from the RFID label on the antenna by using the ANT port, and stores the antenna feature identification information in a storage medium of the controller. Then, the controller searches, in a traversing manner according to the antenna feature identification information stored in the internal storage medium, a weight database stored in the memory, to obtain weight data corresponding to the antenna feature identification information. Then, the weight data is sent to the base station by using the AISG interface and the BTS port, so that the base station forms an antenna beam according to the weight data.

In addition, the antenna function extension device may be connected to another ALD different from an ASD by using the AISG interface. The antenna function extension device may perform AISG communications transparent transmission on the other ALD in a cascading manner, that is, an AISG message is forwarded between the ALD and the base station, and the base station manages the ALD.

After an RFID card reader, an AISG interface, and the like are introduced, the device provided in this embodiment of the present application may obtain antenna feature identification information, and further obtain antenna weight data according to the feature identification information, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

Figure 7:
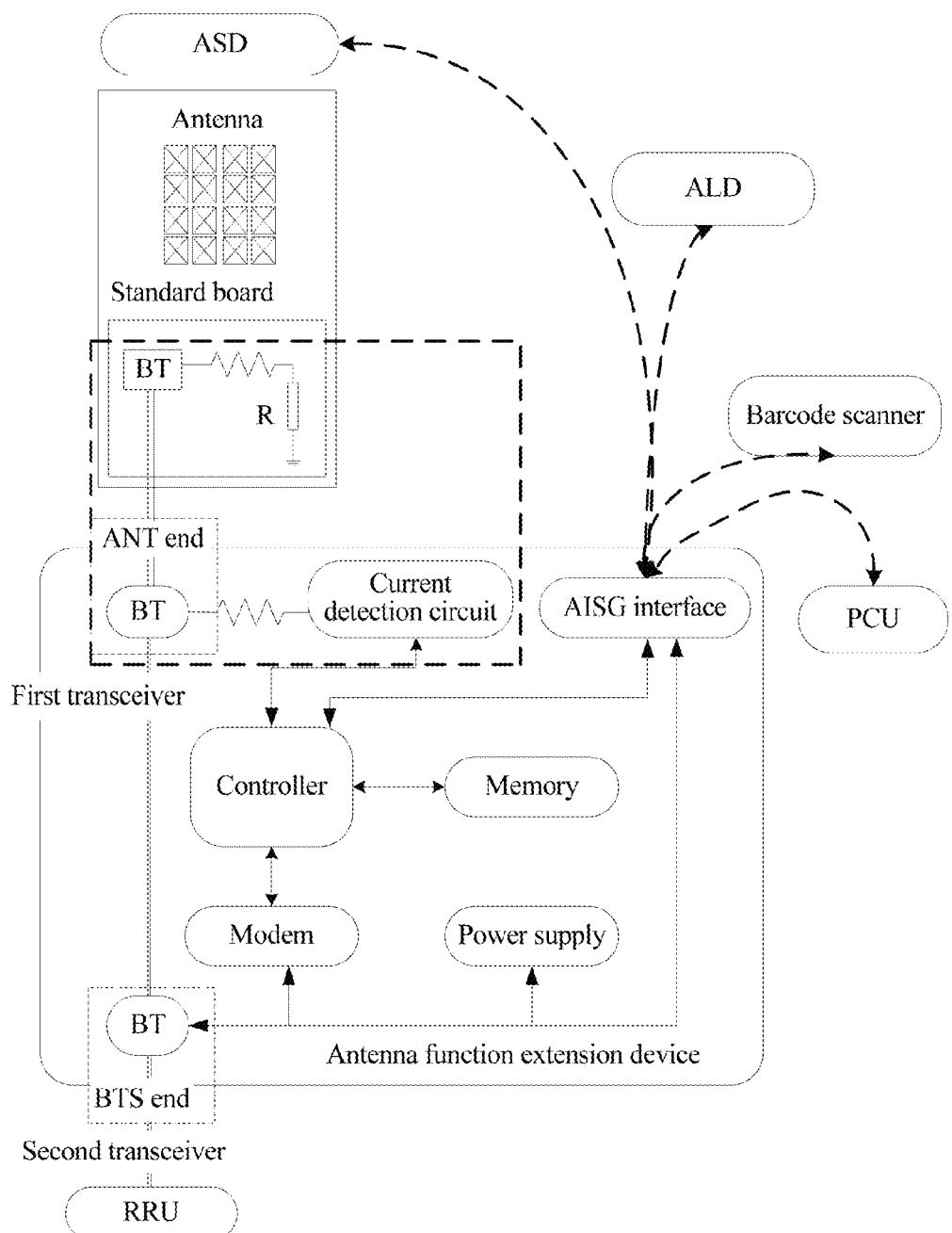
FIG. 7 is a schematic structural diagram of an antenna function extension device according to an embodiment of the present application.

Referring to FIG. 7, an antenna function extension device is corresponding to the antenna function extension apparatus in FIG. 1. A current detection circuit is used as an example of an antenna identification component. The device includes a controller, a memory, a current detection circuit, a modem, a power supply, an Antenna Interface Standards Group AISG interface, an RF channel, a first transceiver, and a second transceiver.

The first transceiver includes a BT module and an ANT port that is connected to a calibration port of an antenna. The second transceiver includes a BT module and a BTS port that is connected to an RF cable of an RRU. The controller is a micro-computer of a chip level, and includes a memory with a relatively small capacity. After the RRU of the base station provides a direct-current power supply signal for the power supply of the antenna function extension device by using the RF cable, the antenna function extension device is started and performs software and hardware initialization. After the software and hardware initialization performed by the antenna function extension device is complete, the controller allocates, to the current detection circuit, the direct-current power supply signal provided by the RRU of the base station by using the RF cable, so as to supply power to the current detection circuit. The RF channel connects the two BT modules, so that communications transmission may be performed between the two BT modules.

After the initialization is complete, the controller triggers the current detection circuit to perform a current detection operation by using the ANT port that is connected to the antenna, calculates a resistance value of an identification resistor R inside the antenna according to a detected current value, and stores the resistance value in a storage medium of the controller. Then, the controller searches, in a traversing manner according to the resistance value stored in the internal storage medium, a table of a correspondence between a resistance value and an antenna model, to obtain antenna feature identification information corresponding to the resistance value, where the table is stored in the memory. The antenna feature identification information may be antenna model information, which is not specifically limited in this embodiment of the present application.

Then, the controller searches, in a traversing manner according to the antenna feature identification information stored in the internal storage medium, a weight database stored in the memory, to obtain weight data corresponding to the antenna feature identification information, and the weight data is sent to the base station by using the AISG interface and the BTS port, so that the base station forms an antenna beam according to the weight data.

It should be noted that, in this embodiment of the present application, the memory of the antenna function extension device stores not only the weight database, but also a table of a correspondence between a resistance value and antenna feature identification information. Therefore, it is convenient to determine the antenna feature identification information such as antenna model information according to the resistance value of the antenna. In this embodiment of the present application, based on a difference inside the antenna, the antenna function extension device also has different variations. For example, when the antenna includes an RFID label, the antenna function extension device does not need to be connected to any peripheral device (such as a barcode scanner or a PCU), and obtains the antenna feature identification information such as the antenna model information by using a built-in RFID card reader. In this case, the memory includes only the weight database. When the antenna includes the identification resistor but no RFID label, the antenna function extension device does not need to be connected to any peripheral device either, and indirectly obtains the antenna feature identification information by using a built-in current detection circuit. In this case, the memory includes not only the weight database, but also the table of the correspondence between a resistance value and antenna feature identification information. When the antenna includes neither the RFID label nor the identification resistor, the antenna feature identification information may be obtained by using the barcode scanner connected to the AISG interface or the PCU connected to the AISG interface.

After an antenna identification component, an AISG interface, and the like are introduced, the device provided in this embodiment of the present application may obtain antenna feature identification information, and further obtain antenna weight data according to the feature identification information, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

Figure 8:
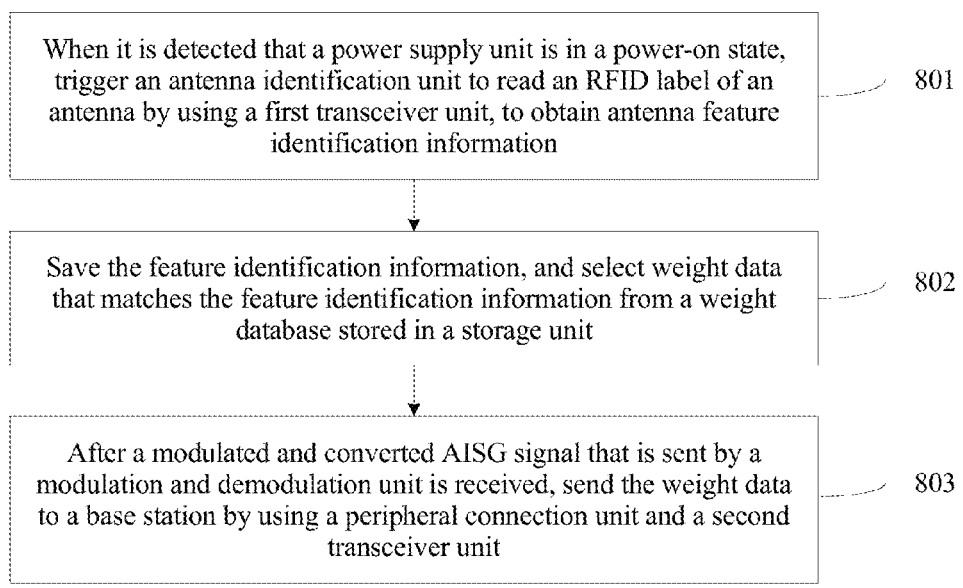
FIG. 8 is a flowchart of an antenna function extension method according to an embodiment of the present application.

FIG. 8 shows an antenna function extension method provided in an embodiment of the present application, and the method is applied to an antenna function extension device. The antenna function extension device includes a control unit, a storage unit, an antenna identification unit, a modulation and demodulation unit, a power supply unit, a peripheral connection unit, an RF channel, a first transceiver unit, and a second transceiver unit. Referring to FIG. 8, the method provided in this embodiment of the present application includes the following steps.

801. When it is detected that the power supply unit is in a power-on state, trigger the antenna identification unit to read an RFID label of an antenna by using the first transceiver unit, to obtain antenna feature identification information.

The antenna feature identification information may be antenna model information, and a type of the feature identification information is not specifically limited in this embodiment of the present application. The antenna identification unit may be an RFID unit, or may be a current detection unit, and a type of the antenna identification unit is not specifically limited in this embodiment of the present application. The type of the antenna identification unit may be determined according to an internal structure of the antenna. When the antenna includes the RFID label, the antenna identification unit may be an RFID unit. When the antenna includes an identification resistor, the antenna identification unit may be a current detection unit.

802. Save the feature identification information, and select weight data that matches the feature identification information from a weight database stored in the storage unit.

The weight database includes weight data corresponding to antennas of various models. An antenna weight refers to a quantization representation of a specific excitation signal exerted by each port of the antenna. A purpose of exerting specific excitation by the port of the antenna is to obtain a directivity pattern with a specific coverage effect. The antenna weight may be expressed in an amplitude/phase manner. An amplitude is generally expressed as a normalized voltage value |Ui| or current value |Ii| (which may also be expressed as normalized power), and a phase is expressed as an angle.

803. After a modulated and converted AISG signal that is sent by the modulation and demodulation unit is received, send the weight data to a base station by using the peripheral connection unit and the second transceiver unit.

The modulation and demodulation unit is configured to convert an AISG signal between two forms: OOK and RS485, and the AISG signal is sent by an RRU of the base station.

In this embodiment of the present application, after the weight data is sent to the base station by using the peripheral connection unit and the second transceiver unit, the base station may form an antenna beam according to the weight data.

Optionally, the method further includes:

when the antenna identification unit fails to read the RFID label of the antenna, receiving, by using the peripheral connection unit, a scanning result sent by a barcode scanner and extracting the antenna feature identification information from the scanning result, where the barcode scanner is connected to the peripheral connection unit, and the barcode scanner is configured to scan a barcode of the antenna.

For this case, because no RFID label is arranged on a smart antenna, no RFID label of the antenna can be read. Therefore, the barcode of the antenna may be scanned by using the barcode scanner that is connected to the peripheral connection unit, so as to obtain the antenna feature identification information such as the antenna model information.

Optionally, the method further includes:

when the antenna identification unit fails to read the RFID label of the antenna, receiving an input result of a portable control unit PCU by using the peripheral connection unit, and extracting the antenna feature identification information from the input result, where the PCU is connected to the peripheral connection unit, and is configured to receive input antenna information.

For this case, because no RFID label is arranged on a smart antenna, no RFID label of the antenna can be read. Therefore, the antenna feature identification information such as the antenna model information may be obtained by using the PCU that is connected to the peripheral connection unit. The PCU is a near-end configuration tool, and stores the antenna feature identification information.

Optionally, after it is detected that the power supply unit is in a power-on state, the method further includes:

obtaining, by using the peripheral connection unit, an antenna survey parameter in an ASD; and after a modulated and converted AISG signal that is sent by the modulation and demodulation unit is received, sending the survey parameter to the base station by using the peripheral connection unit and the second transceiver unit.

The survey parameter may include a geographic location parameter, a height parameter, a mechanical tilt parameter, a mechanical azimuth parameter, and the like that are of the antenna, which is not specifically limited in this embodiment of the present application.

According to the method provided in this embodiment of the present application, after an antenna identification unit, a peripheral connection unit, and the like are introduced, antenna feature identification information may be obtained, and antenna weight data according to the feature identification information is further obtained, so that a function of performing weight management on an antenna is extended. In addition, an antenna survey parameter may further be obtained, so that a survey parameter measurement function is extended. Not only extension costs are relatively low, an engineering difficulty is relatively small, and function extension efficiency is high, but it is also convenient for a base station to manage the antenna according to the weight data and the survey parameter.

It should be noted that, when an antenna function extension apparatus provided in the foregoing embodiments performs antenna function extension, division of the foregoing function modules is merely used as an example for illustration. In actual application, the foregoing functions may be allocated to different function modules and implemented according to a requirement, that is, an inner structure of the apparatus is divided into different function modules to implement all or a part of the functions described above. In addition, the antenna function extension apparatus and the antenna function extension method embodiment that are provided in the foregoing embodiments pertain to a same concept. For a specific implementation process of the antenna function extension apparatus, refer to the method embodiment, and details are not described herein again.

Persons of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of the present application, but are not intended to limit the present application. Any modification, equivalent replacement, and improvement made without departing from the spirit and principle of the present application shall fall within the protection scope of the present application.

What is claimed is:

1. An antenna function extension apparatus, comprising: an antenna identification component; a power supply; a peripheral connection unit; a radio frequency (RF) channel; a memory; a controller separately connected to the memory, the antenna identification component and the peripheral connection unit; a first transceiver connected to the antenna identification component; a second transceiver separately connected to the power supply and the peripheral connection unit; wherein: the first transceiver is connected to a calibration port of an antenna that is external to the function extension apparatus; the second transceiver is connected to a remote radio unit (RRU) of a base station by an RF cable; the antenna identification component is configured to obtain antenna feature identification information from an RFID label of the antenna via the first transceiver; the power supply is configured to receive, via the second transceiver, a direct-current power supply signal provided by the RRU; and the first transceiver and the second transceiver are separately located at two ends of the RF channel.

2. An antenna function extension apparatus, comprising: an antenna identification component; a power supply; a peripheral connection unit; a radio frequency (RF) channel; a memory; a controller separately connected to the memory, the antenna identification component and the peripheral connection unit; a first transceiver connected to the antenna identification component; a second transceiver separately connected to the power supply and the peripheral connection unit; wherein: the peripheral connection unit is connected to an alignment sensor device (ASD); and the peripheral connection unit is configured to: receive an antenna survey parameter sent by the ASD, and transmit the survey parameter to the controller.

3. An antenna function extension apparatus, comprising: an antenna identification component; a power supply; a peripheral connection unit; a radio frequency (RF) channel; a memory; a controller separately connected to the memory, the antenna identification component and the peripheral connection unit; a first transceiver connected to the antenna identification component; a second transceiver separately connected to the power supply, and the peripheral connection unit; wherein: the peripheral connection unit is connected to another antenna line device (ALD) different from an alignment sensor device; and the peripheral connection unit is configured to forward an Antenna Interface Standards Group (AISG) message between a base station and the ALD.

4. An antenna function extension apparatus for connection between an antenna unit and a base station, the antenna function extension apparatus comprising: a first transceiver; an antenna identification component coupled to the first transceiver and configured to obtain antenna feature identification information from the antenna unit via the first transceiver; a controller coupled to the antenna identification component and configured to: store the obtained antenna feature identification information in a memory, and select weight data stored in the memory that corresponds to the obtained antenna feature identification information; and a second transceiver coupled to the controller and configured to: connect to a remote radio unit (RRU) of the base station, and transmit the selected weight data to the RRU.

5. The apparatus according to claim 4, wherein:
the antenna identification component comprises a current detection circuit for obtaining a resistance value of a component in the antenna; and
the controller is configured to obtain the antenna feature identification information corresponding to the obtained resistance value.

6. The apparatus according to claim 4, wherein the antenna identification component comprises a radio frequency ID (RFID) reader configured to read an RFID label on the antenna via the first transceiver.

7. The apparatus according to claim 6, further comprising a peripheral connection unit configured to:
connect to a peripheral device; and
obtain antenna feature identification information of the antenna from the peripheral device.

8. The apparatus according to claim 7 wherein the peripheral connection unit comprises an interface compliant with an Antenna Interface Standards Group (AISG) standard.

9. The apparatus according to claim 7 wherein the peripheral device comprises at least a one of:
a barcode scanner; and
a portable control unit (PCU).

10. The apparatus according to claim 7 wherein:
the controller is coupled to the peripheral connection unit and configured to:
select weight data stored in the memory that corresponds to the antenna feature identification information obtained from the peripheral device; and
the second transceiver is further configured to:
transmit to the RRU the selected weight data that corresponds to the antenna feature identification information obtained from the peripheral device.

11. The apparatus according to claim 10 wherein the antenna survey parameter comprises at least one of: geographic location parameter, a height parameter, a mechanical tilt, and a mechanical azimuth.

12. The apparatus according to claim 7 wherein the obtained antenna identification information comprises at least one of:
basic antenna information;
antenna model information; and
an antenna directivity pattern file.

13. The apparatus according to claim 4, wherein:
the peripheral connection unit is configured to:
connect to an alignment sensor device (ASD), and
receive an antenna survey parameter sent by the ASD; and
the second transceiver is configured to transmit the antenna survey parameter to the RRU.

14. The apparatus according to claim 4 wherein the peripheral connection unit is configured to:
connect to another antenna line device (ALD) different from an alignment sensor device (ASD); and
forward an Antenna Interface Standards Group (AISG) message between the base station and the ALD.

* * * * *